United States Patent [19]
Perez

[11] 3,935,804
[45] Feb. 3, 1976

[54] COFFEE BREWER

[76] Inventor: Thomas Perez, 3310 NW. 9th Court, Miami, Fla. 33127

[22] Filed: Jan. 28, 1975

[21] Appl. No.: 544,842

[52] U.S. Cl. .................................. 99/293; 99/306
[51] Int. Cl.² ........................................ A47J 31/057
[58] Field of Search ............ 99/293, 279, 285, 287, 99/292, 300, 302, 303, 306, 307, 321, 322

[56] References Cited
UNITED STATES PATENTS

| | | | |
|---|---|---|---|
| 462,656 | 11/1891 | DeAtley | 99/293 X |
| 1,165,480 | 12/1915 | Wood | 99/293 |
| 2,354,008 | 7/1944 | Grey | 99/292 UX |
| 3,077,156 | 2/1963 | Egi et al. | 99/287 X |
| 3,368,476 | 2/1968 | Mancioli | 99/293 |
| 3,670,641 | 6/1972 | Mancioli | 99/293 |

*Primary Examiner*—Robert L. Bleutge
*Assistant Examiner*—Arthur O. Henderson

[57] ABSTRACT

A coffee brewer comprising an upper and lower receptacle joined together and including a means intermediate the upper and lower receptacle for captivating a charge of coffee and water, whereby when water is heated in the lower chamber it will be caused to flow through the captivated charge in a vapor form to rise to the upper chamber to be cooled and form a well brewed cup of coffee.

3 Claims, 3 Drawing Figures

COFFEE BREWER

FIELD OF THE INVENTION

In the past there have been numerous types of coffee brewers and this invention relates to an improved coffee brewing device for small amounts of coffee particularly.

BACKGROUND OF THE INVENTION

As is perhaps well known in a strong brew of coffee, often known as Expresso coffee, it is often desired to utilize sugar. There is a variance in the amount of sugar that is desired; however, it has been found that if the sugar is applied to the water before it is formed into the coffee brew, it has a more uniform and pleasing taste.

This invention provides an improved type of coffee brewing device which includes an upper and lower receptacle which are united together and between which there is captivated a holder to hold a charge of sugar and coffee to be brewed simultaneously upon the application of heat to a charge of water in the lower receptacle which, through filter means is caused to pass through the bag and to brew the coffee.

DESCRIPTION OF THE PREFERRED EMBODIMENT

Figure 1:
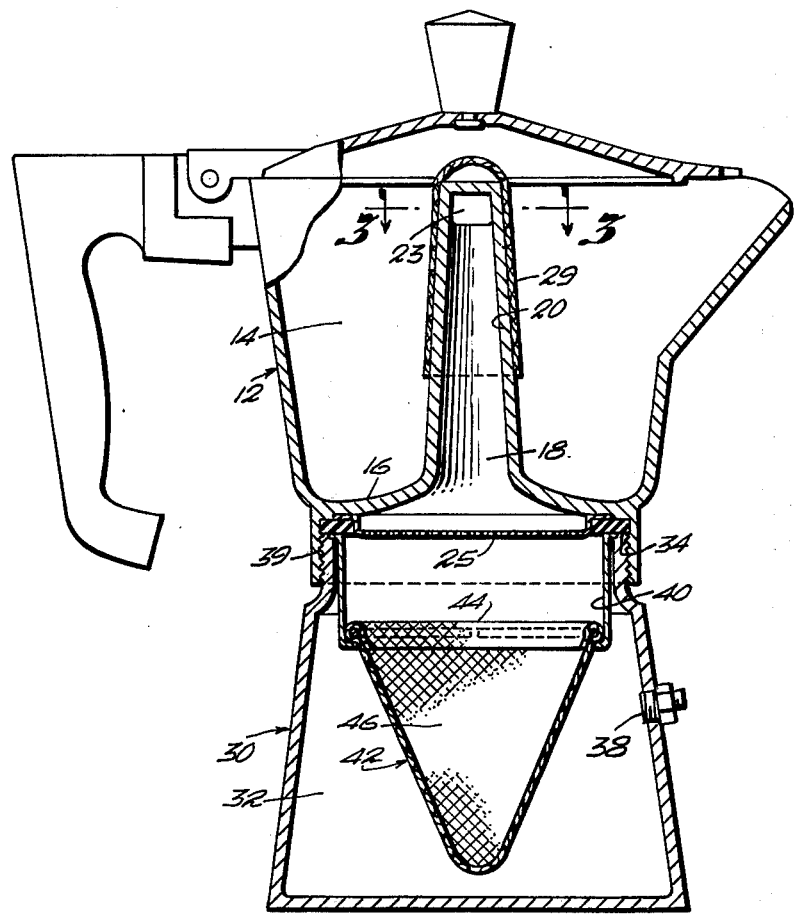
FIG. 1 is a vertical cross-sectional view of the coffee brewer of the present invention.
Figure 2:
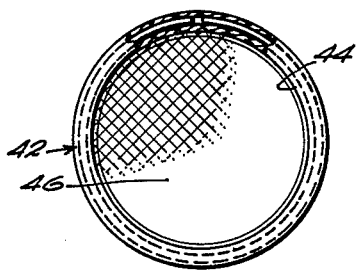
FIG. 2 is a top plan view of the filter bag as seen in FIG. 1 with parts broken away to better illustrate the construction thereof.
Figure 3:
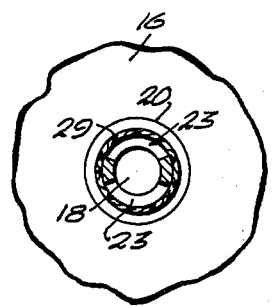
FIG. 3 is a cross-sectional view taken along the line 3—3 of FIG. 1.

Referring to the drawings wherein like reference characters designate like or corresponding parts throughout the several views and referring particularly to FIG. 1, there is shown an upper receptacle 12 which defines an upper chamber 14 with a floor 16 having an opening 18 and an open topped tower 20 extending vertically in the upper chamber about the opening, the open top being designated by the numeral 23. Preferably, filter means are provided at the bottom of the tower in the form of a screen 25 and, externally about the tower there may be applied an inverted cone-shaped filter member which snugly nests about the tower and provides a filter barrier, said filter being designated by the numeral 29. The device also includes a lower receptacle 30 defining a chamber 32 with an open top 34 and a side port with a release valve 38. Means, preferably threaded means shown at 39 are provided to connect upper chamber floor over the lower chamber top with the only fluid communication between the upper and lower chamber being through the opening 18 and through the open top tower 20.

A coffee and sugar holder 40 is captivated between the upper and lower receptacle and completely spans the opening. The holder 40 comprises an annular member sized to nest in the open top 34 in spanning relation thereto, and to be supported by the peripheral edge of said open top 34. Suspended from the holder 40 there is provided a filter bag 42 with an open top 44 and a cone-shaped bottom 46 and into which a charge of sugar and coffee is applied.

In use, a charge of water is applied into the lower receptacle 30. A charge of sugar and then a charge in the form of an upper layer of coffee is applied in the bag. Heat is applied after the upper and lower receptacle are united together which causes the water to heat, vaporize, and pass upwardly through the sugar and coffee in the bag 42 and passing upwardly through the tower 20 into the upper chamber 14, where it cools and de-vaporizes forming a well brewed cup of coffee with sugar and water and coffee in a preferred brewed solution.

What is claimed is:
1. A coffee brewer comprising:
an upper receptacle defining an upper chamber with a floor having an opening and an opened top tower extending vertically in the upper chamber about the opening and filter means included on said tower, said tower extending substantially above the floor and toward the upper portion of said upper receptacle chamber,
a lower receptacle defining a lower chamber with an open top and a side vent,
means to connect the upper chamber floor over the lower chamber top, whereby the passageway through the opening and tower comprise the only means of fluid communication between the chamber of the upper end and the chamber of the lower receptacle,
a coffee and sugar holder captivated between the upper and lower receptacle, and completely spanning the opening, said holder comprising an annular member sized to nest in the open top and means captivating the holder in the open top of said upper receptacle, and a bag suspended from said annular member and extending into the lower chamber to hold a lower charge of sugar and an upper charge of coffee, said bag having an open upper end in said opening and a closed lower end,
expandible ring means carried by the open upper end of the bag and releasably engaged in said annular member to suspend said bag in said lower chamber,
whereby when a charge of sugar and an upper charge of coffee is placed in the bag, and the bag is suspended on said holder, and the receptacles are united together captivating the bag and heat is applied to boil water in the lower chamber, the same will pass as a vapor through the wall of the bag and sugar and coffee forming coffee which rises through the opening, through the tower, and upon cooling descends into the upper chamber to provide a well brewed cup of coffee.

2. The device as set forth in claim 1 wherein said filter means on said tower comprises an internal screen.

3. The device as set forth in claim 1 wherein said filter means comprises an inverted cone-shaped bag sized to snugly nest over the upper open end of said tower to provide a filter barrier through which vapor must pass.

* * * * *